United States Patent [19]
Jaques

[11] 3,979,106
[45] Sept. 7, 1976

[54] STEEL TAPE AND WIRE PULLER

[76] Inventor: Michael J. Jaques, 602 S. Hobson, Mesa, Ariz. 85204

[22] Filed: Aug. 7, 1975

[21] Appl. No.: 602,689

[52] U.S. Cl. .................................... 254/134.3 FT
[51] Int. Cl.² ................................. B65H 59/00
[58] Field of Search ........... 254/134.3 FT, 134.3 R; 24/115 R, 132, 123, 115 N, 131 C; 57/3.5, 139, 142; 114/230; 403/53, 62, 78, 74

[56] References Cited
UNITED STATES PATENTS

| | | | |
|---|---|---|---|
| 525,770 | 9/1894 | Parker | 24/131 C |
| 1,802,657 | 4/1931 | Kellems | 24/115 N |
| 2,181,392 | 11/1939 | Chatham | 24/115 N |
| 2,463,116 | 3/1949 | Lewis | 403/78 |
| 2,709,438 | 5/1955 | Murray | 24/115 R |
| 2,962,998 | 12/1960 | Long | 24/115 R |
| 2,990,803 | 7/1961 | Henderson | 114/230 |
| 3,036,351 | 5/1962 | Root | 403/53 |
| 3,094,755 | 6/1963 | Casanave | 114/230 |
| 3,102,715 | 9/1963 | Weitzel et al. | 254/134.3 FT |
| 3,858,848 | 1/1975 | MacFetrich | 254/134.3 FT |

Primary Examiner—Al Lawrence Smith
Assistant Examiner—Robert C. Watson
Attorney, Agent, or Firm—Warren F. B. Lindsley

[57] ABSTRACT

A steel tape and wire puller for installing electrical conductors or other elongated relatively stiff articles in conduits. The wire puller comprises an elongated cordage portion possessing a relatively high tensil strength and low coefficient of friction. At one end of the elongated cordage portion a loop is pivotally attached thereto. The loop serves as a handle for the wire puller. Wire such as fish tape, snake wire or the like is tightly grasped along its length between the strands of the elongated cordage portion.

6 Claims, 6 Drawing Figures

U.S. Patent  Sept. 7, 1976  3,979,106
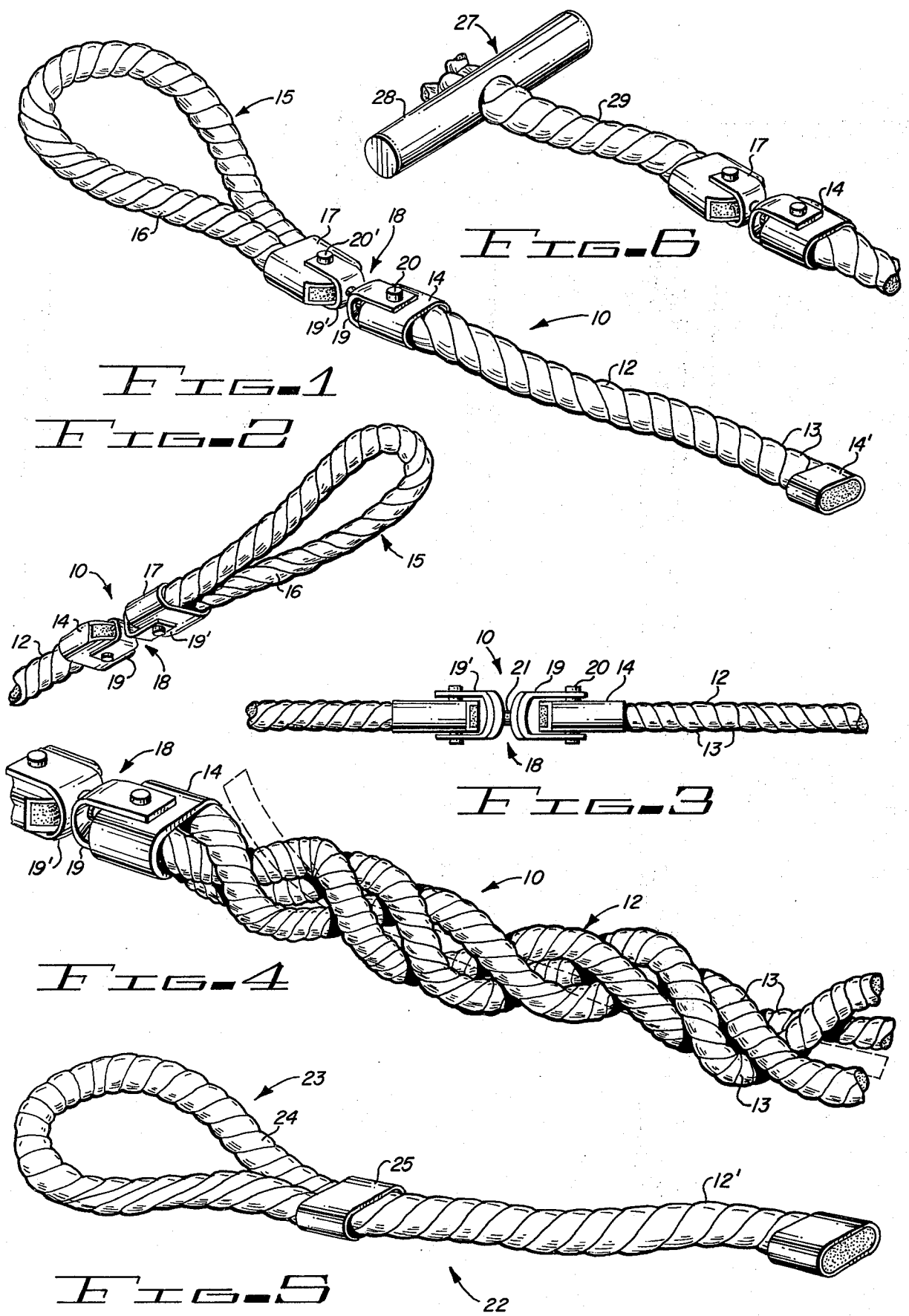

STEEL TAPE AND WIRE PULLER

Background of the Invention

Heretofore, various means have been utilized for installing electrical conductors in conduits, the device most frequently employed in the past comprising a metallic "fish tape" or "snake wire" which may be made from a flattened strip or spring steel material or may be formed of braided metal strands. In practice, such fish tapes or snake wires are pushed through a conduit preparatory to attaching either a guide line or an electrical conductor to the trailing end of the fish tape, after which the guide line or the electrical conductor is pulled through the conduit by means of the fish tape.

Metallic fish tapes of the type described when used without a gripping means have proven unsatisfactory in many cases in that their inherent spring-like characteristics render them difficult to control, since they tend to uncoil and assume an unmanageably mass preparatory to being inserted into the conduit. Still another disadvantage of this type of fish tape is the difficulty in grasping it following its passage through a conduit, the metallic nature of the fish tape being such as to readily cut the hands of the operator and to render it difficult to grasp.

Because of the tendency of metallic fish tapes or snake wires to cut the hands of the operator and the difficulty in grasping such a tape, resort is frequently made to the use of pliers to grasp the fish tape. This is objectionable in that the pliers tend to kink and cut into the fish tape thereby rendering it unsatisfactory for further installation into conduits by roughening its surface.

SUMMARY OF THE INVENTION

In accordance with the invention claimed, an improved steel tape and wire puller is provided which make it possible to safely grip these stems without cutting the hands of the user as well as making it possible to apply more force to the wire or tape to pull it through a tightly packed conduit.

It is, therefore, one object of this invention to provide an improved steel tape and wire puller.

Another object of this invention is to provide an improved wire puller employing a multiplicity of strands which are loosely interwoven about a common axis so that they may be partially unwoven or loosened to interlace with the steel tape or wire to firmly grip it when the strands are released and revert to their interwoven normal position.

A further object of this invention is to provide an improved fibrous interlaced wire puller wherein the interwoven strands grip the steel tape or wire along a predetermined portion of its length.

A still further object of this invention is to provide an improved steel tape and wire puller which is economical to manufacture and easy to use.

Further objects and advantages of the invention will become apparent as the following description proceeds and the features of novelty which characterize this invention will be pointed out with particularity in the claims annexed to and forming part of this specification.

BRIEF DESCRIPTION OF THE DRAWING

The present invention may be more readily described by reference to the accompanying drawing in which:

FIG. 1 is a perspective view of a steel tape and wire puller which embodies a swivel joint between its two parts;

FIG. 2 is a partial perspective side view from the opposite side shown in FIG. 1 with the metallic collar omitted at the end of the twisted wire since its shape is obvious from FIG. 1;

FIG. 3 is an enlarged partial side view of the tape and wire puller more clearly showing the swivel joint;

FIG. 4 is an enlarged partial view of the tape and wire puller's end with a steel tape shown in dotted lines to illustrate the utility of the structure and the way the strands of the cord are untwisted in order to lay the steel tape therebetween;

FIG. 5 is a modification of FIGS. 1–4 wherein the swivel joint is omitted from the steel tape and the wire puller; and FIG. 6 is a partial view of a modification of the steel tape and wire puller shown in FIGS. 1–5 employing a different hand gripping means.

DESCRIPTION OF THE PREFERRED EMBODIMENT

Referring more particularly to the drawing by characters of reference, FIGS. 1–4 disclose a steel tape and wire puller 10 for pulling a wire or steel tape 11 connected to electrical conductors through a conduit. Only a portion of the snake wire or fish tape 11 is shown since the use of these devices for pulling wires through a conduit is well known.

The wire puller 10 comprises an elongated cordage portion 12 formed from a plurality of strands which may, for example, comprise abrasive resistant thermoplastic strands 13 possessing a relatively high tensile strength and low coefficient of friction. These strands or other suitable materials such as a fibrous rope material are braided into an elongated member having suitable caps 14, 14' one at each end which is intended to tightly fit around the ends of the strands to hold them together in their braided configuration. While it should be understood that the cordage portion may be braided from any suitable material such as thermoplastic strand material having a relatively high tensile strength plus a low coefficient of friction, it is preferred to use strands of high tenacity polyethylene having uniformly smooth, slick surfaces for this purpose.

At one end of the cordage portion 12 is provided a loop 15 which may be formed out of the same braided strand material as the cordage portion 12. The loop is formed by taking a portion 16 of the braided material and turning it backwardly upon itself to form the loop with the free ends of the portion 16 held tightly together by a clamp 17. Clamp 17 holds the ends of portion 16 tightly together in the loop configuration which then serves as a handle for the steel tape and wire puller.

Loop 15 is then pivotally connected to cordage portion 12 by a suitable means such as pivot means 18. This means is shown as comprising two U-shaped straps 19, 19' with strap 19 pivotally connected to cap 14 at one end of the cordage portion 12 by a bolt or rivit 20 extending through one leg of the strap 19, cap 14 and into and through the other leg of the strap. Strap 19' is pivotally connected to cap 17 of loop 15 in the same manner as strap 19 by having a suitable belt or pivot pin 20' extending through one leg of strap 19', cap 17, and the other leg of strap 19'. A double headed pin 21 interconnects the crest of each strip with the head of the pin at one end position between the legs of the one strap and the head at the other end of the pin positioned between the legs of the other strap as shown in FIG. 3.

FIG. 4 illustrates the manner in which the wire or strap of a fish tape, snake wire or the like may be tightly grasped along its length at many points to tightly grip and hold on to the wire. To grip the tape 11, the cordage portion of the wire puller is merely unwound, or unbraided a bit so that the tape 11 may be laid between the strands. When the braids of the cordage portion are released they will assume their normal position and in doing so encompass or surround the tape thereby tightly gripping the tape. Thus, the fish tape or wire can be grasped firmly and tightly along a long section thereof and comfortably pulled by grasping the loop 15. The pivot connection aids in positioning the loop relative to the cordage portion in a number of different positions for aid in pulling on the end of the tape 11.

FIG. 5 discloses a modification of the tape and wire puller 10 shown in FIGS. 1–4 wherein the puller 22 comprises a loop portion 23 of braided strands 24 tightly gripped by a cup 25 which also grips one end of the cordage portion 12' which is similar to cordage portion 12 except cap 14 is replaced by cap 25.

This puller is used in the same manner as puller 10 of FIGS. 1–4 except it is formed without the pivotal means of the structure shown in FIGS. 1–4.

It should be recognized that any suitable pivotally means may be used in the structure shown in FIGS. 1–4 and the loop may be formed of any material other than a braid stranded configuration and still fall within the scope of this invention.

For example, as shown in FIG. 6, the loop may be replaced by a handle 27 comprising a hand gripping rod 28 arranged laterally of the handle extension 29 which may be directly connected to cap 14 of cordage portion 12 or to a clamp 17 which is pivotally connected to cap 14 in the manner as shown in FIGS. 1–4.

Although but two embodiments of the present invention have been illustrated and described, it will be apparent to those skilled in the art that various changes and modifications may be made therein without departing from the spirit of the invention or from the scope of the appended claims.

I claim:

1. A steel tape and wire puller comprising:

a handle portion comprising a first elongated member forming a loop having a plurality of braided strands, the ends of said first elongated member being interconnected by a first cap member, a cordage portion formed of a plurality of strands of a pliable plastic material braided to form a second elongated member, the ends of said second elongated member being interconnected by a second cap member, and means for pivotally interconnecting the first and second cap members, whereby when said strands of said cordage portion of said puller are unbraided a predetermined amount along the length thereof and an end portion of a steel tape or wire is layed between the strands and the strands then released to assume their normal braided position, the strands of the cordage portion will firmly grip the tape or wire along given portion of its length.

2. The steel tape and wire puller set forth in claim 1 wherein:

said loop portion is formed of the same type and amount of braided strands as said cordage portion.

3. The steel tape and wire puller set forth in claim 1 wherein:

said cordage portion is formed of a plurality of abrasive resistant thermoplastic strands.

4. The steel tape and wire puller set forth in claim 3 wherein:

said cordage portion is formed of a plurality of abrasive resistant thermoplastic strands.

5. The steel tape and wire puller set forth in claim 1 wherein:

said cordage portion is formed of high tenacity polyethylene material.

6. The steel tape and wire puller set forth in claim 1 wherein:

said means for pivotally interconnecting said first and second cap members comprises a pair of U-shaped members the legs of each surrounding a different cap member with the crown of the U-shaped member facing outwardly of the respective cap member, a pair of pins each extending through the legs of a given U-shaped member and pivotally connecting that U-shaped member to the associated cap member, and pin means extending through the crowns of each of said cap members for pivotally connecting the loop portion and cordage portion together.

* * * * *